United States Patent
Rubinsztajn et al.

(10) Patent No.: US 9,359,479 B2
(45) Date of Patent: Jun. 7, 2016

(54) METHODS OF USING BORON-CONTAINING ADDITIVES AS SILICON CARBIDE CROSSLINKING AGENTS

(71) Applicant: GENERAL ELECTRIC COMPANY, Schenectady, NY (US)

(72) Inventors: Slawomir Rubinsztajn, Niskayuna, NY (US); Matthew Hal Littlejohn, Niskayuna, NY (US); Ryan Christopher Mills, Niskayuna, NY (US); Peter Kennedy Davis, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 388 days.

(21) Appl. No.: 13/905,732

(22) Filed: May 30, 2013

(65) Prior Publication Data

US 2014/0353868 A1 Dec. 4, 2014

(51) Int. Cl.

| | |
|---|---|
| *C01B 31/36* | (2006.01) |
| *C08G 77/54* | (2006.01) |
| *C04B 35/622* | (2006.01) |
| *C08G 77/60* | (2006.01) |
| *C08G 77/62* | (2006.01) |
| *C04B 35/626* | (2006.01) |
| *D01F 9/10* | (2006.01) |

(52) U.S. Cl.
CPC ............... *C08G 77/54* (2013.01); *C01B 31/36* (2013.01); *C04B 35/6269* (2013.01); *C04B 35/62281* (2013.01); *C04B 35/62295* (2013.01); *C08G 77/60* (2013.01); *C08G 77/62* (2013.01); *D01F 9/10* (2013.01); *C04B 2235/3409* (2013.01); *C04B 2235/483* (2013.01); *C04B 2235/5264* (2013.01); *C04B 2235/9661* (2013.01)

(58) Field of Classification Search
CPC ............ D01F 9/10; C01B 31/36; C08G 77/54
See application file for complete search history.

(56) References Cited

U.S. PATENT DOCUMENTS

| | | | |
|---|---|---|---|
| 4,460,638 | A | 7/1984 | Haluska |
| 5,030,744 | A | 7/1991 | Funayama et al. |
| 5,086,126 | A | 2/1992 | Mahone |
| 5,268,496 | A | 12/1993 | Geisberger |
| 5,386,006 | A | 1/1995 | Matsumoto et al. |
| 5,464,918 | A | 11/1995 | Schwark |
| 5,851,942 | A | 12/1998 | Sacks et al. |
| 5,968,859 | A | 10/1999 | Baldus et al. |
| 6,242,626 | B1 | 6/2001 | Eiling et al. |
| 2011/0028302 | A1 | 2/2011 | Weinmann et al. |
| 2011/0212329 | A1* | 9/2011 | Pope ........................ C01B 31/36 428/367 |

FOREIGN PATENT DOCUMENTS

| | | |
|---|---|---|
| DE | 4320783 A1 | 1/1994 |
| DE | 4320784 A1 | 1/1994 |
| DE | 19741458 A1 | 3/1999 |

OTHER PUBLICATIONS

Chavez, et al.; "Effect of Ambient Atmosphere on Crosslinking of Polysilazanes," Journal of Applied Polymer Science, Jan. 15, 2011, vol. 119, Issue 2, pp. 794-802.

Markus Weinmann; "Chapter 18—Organosilicon Polymers as Precursors for Ceramics," Polymer-based Ceramics, pp. 472-484.

Weinmann, et al; "Tris(hydridosilylethyl)boranes: highly reactive synthons for polymeric silicon compounds," Journal of Organometallic Chemistry, 1999, vol. 592, pp. 115-127.

International Search Report and Written Opinion issued in connection with corresponding PCT Application No. PCT/US2014/033403 on Jul. 28, 2014.

* cited by examiner

*Primary Examiner* — Galen Hauth
(74) *Attorney, Agent, or Firm* — John P. Darling

(57) ABSTRACT

The present disclosure generally relates to methods of using boron-containing additives for crosslinking polysilazane green fibers, which are precursors to silicon carbide fibers. These methods provide a controllable process for crosslinking silicon carbide fibers while providing a simple way for the introduction of boron as a sintering aid into the polymer structure.

12 Claims, No Drawings

METHODS OF USING BORON-CONTAINING ADDITIVES AS SILICON CARBIDE CROSSLINKING AGENTS

TECHNICAL FIELD

The present disclosure generally relates to methods of forming silicon carbide fibers. In some specific embodiments, the present disclosure relates to polydisilazane resins and methods of forming and using them.

BACKGROUND

Polysilazane green fibers are precursors to silicon carbide (SiC) fibers. These green fibers must be cross-linked to make them infusible so that the fiber's dimensional integrity is maintained during subsequent pyrolysis steps. The current commercially viable crosslinking process of green fibers involves exposure of a package of polycarbosilane or polysilazane green fibers to high energy e-beam radiation. However, the high energy e-beam system is prohibitively expensive due to the large capital investment. Further, the currently practiced irradiation process takes several hours due to the requirement that the temperature of irradiated fibers not reach the melting point of polysilazane resin. The required large e-beam dose, therefore, must be delivered at a slow rate. The irradiated fiber package then must ride around a long conveyor belt to cool down before returning to the e-beam for another small dose. The package goes under the beam enough times to receive the cumulative dose needed for effective crosslinking.

Other prior art methods of making polysilazane green fibers infusible involve exposure of the fibers to moisture, which provides a cross-linked fiber with high level of oxygen. Some specially formulated polysilazane green fibers may also be cross-linked by UV irradiation. Other methods involve exposing the green fibers to reactive and toxic gases such as ammonia, $BCl_3$ or $HSiCl_3$. Such processes present several environmental health and safety challenges and are expensive due to the toxic nature of the reagents.

Boron is used as a sintering aid during high temperature heat treatment of silicon carbide ceramic materials. In general, boron is present at relatively low concentrations. The presence of boron sintering aid at higher concentrations leads to an increase in undesirable high temperature mechanical properties of the ceramic, such as creep.

BRIEF DESCRIPTION

The present disclosure provides, in a first aspect, a polydisilazane resin. This resin contains at least one residue of the structure shown below:

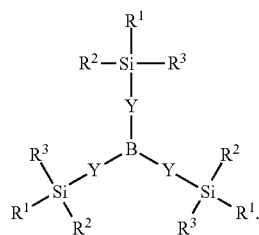

In this structure, Y is $(C_2-C_3)$alkylene; and $R^1$, $R^2$, and $R^3$ are each independently selected from phenyl, $(C_1-C_{12})$alkyl, a bond to a nitrogen atom, chlorine, and bromine. At least one instance of $R^1$, $R^2$, and $R^3$ is a bond to a nitrogen atom in the resin.

The present disclosure provides, in a second aspect, a method of forming a polydisilazane resin. The method includes reacting the following in an oxygen-free and moisture-free system:
  a) at least one methylchlorodisilane;
  b) at least one organochlorosilane which contains at least one vinyl or allyl group. The concentration of olefin in the polydisilazane resin is greater than 1 mol/kg;
  c) an additive of formula I

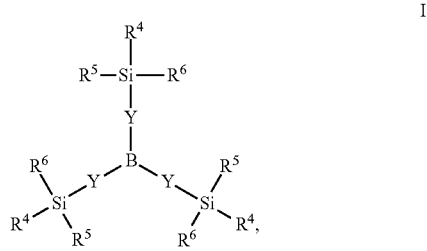

wherein
  Y is $(C_2-C_3)$alkylene; and
  $R^4$, $R^5$, and $R^6$ are each independently selected from phenyl, $(C_1-C_{12})$alkyl, chlorine, and bromine. At least one instance of $R^4$, $R^5$, and $R^6$ must be selected from chlorine and bromine; and
  d) at least one nitrogen-containing additive selected from hexamethyldisilazane, tetramethyldisilazane, divinyltetramethyldisilazane, methylamine, and ammonia.

The present disclosure provides, in a third aspect, a method of preparing a silicon carbide fiber. This method includes forming a polydisilazane resin in an oxygen-free and moisture-free system, by reacting:
  i) at least one methylchlorodisilane;
  ii) at least one organochlorosilane containing at least one vinyl or allyl group. The concentration of olefin in the polydisilazane resin is greater than 1 mol/kg;
  iii) at least one nitrogen-containing additive selected from hexamethyldisilazane, tetramethyldisilazane, divinyltetramethyldisilazane, methylamine, and ammonia; and
  iv) an additive of formula I

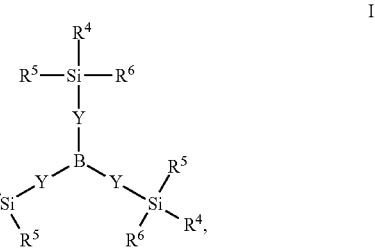

as described above.

The resulting polydisilazane resin is then spun to form a polydisilazane fiber, and the polydisilazane fiber is exposed to oxygen and optionally moisture to form a cross-linked polydisilazane fiber. The cross-linked polydisilazane fiber is then pyrolyzed in oxygen free atmosphere to form a silicon carbide fiber.

These and other objects, features and advantages of this disclosure will become apparent from the following detailed description of the various aspects of the disclosure taken in conjunction with the accompanying drawings.

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Alkylboranes, including alkylboranes containing Si—Cl functional groups, can be used as free radical precursors. The exposure of a polysilazane green fiber containing such alkylboranes to oxygen leads to a rapid reaction of the oxygen with the alkylboranes. This process generates free radicals, which trigger the polysilazane green fiber crosslinking.

Disclosed herein is a controllable process for crosslinking polysilazane green fibers containing at least one unsaturated functional group, which is reactive in the presence of free radicals. Examples of such groups include but are not limited to vinyl, allyl, acrylate, methacrylate, vinylether, or styryl. The disclosure provides for a simple low temperature crosslinking of polysilazane green fibers by exposure to oxygen. The rate and extension of this process can be controlled by the amount of alkylborane precursor in the polysilazane green fiber, the type and molar concentration of free radical-sensitive functional groups in the polysilazane precursor, the amount of added oxygen, and the temperature of the cure process. The amount of oxygen incorporated into the polymer structure can be controlled. Additionally, the alkylborane crosslinking agents also serve as a source of boron. It is well known that boron is an excellent sintering aid for SiC materials. It is often desirable to have a boron concentration in SiC ceramics of 0.02 to 2 wt %. The disclosed process can be performed in a batch or a continuous system and eliminates needs for expensive e-beam facilities, resulting in low required capital investment.

The disclosure includes embodiments related to a polydisilazane resin. This resin is a useful precursor to silicon carbide fibers. The polydisilazane resin contains at least one residue of structure:

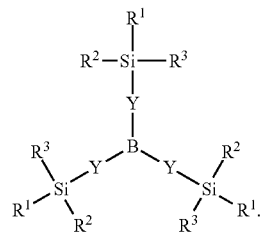

In some embodiments, Y is $(C_2-C_3)$alkylene. In some embodiments, Y is —$CH_2$—$CH_2$—. In some embodiments, Y is —$CH(CH_3)$—. In some embodiments, Y is —$CH_2CH_2CH_2$—. In some embodiments, Y is —$CH_2CH(CH_3)$—.

In some embodiments, $R^1$, $R^2$, and $R^3$ are each independently selected from phenyl, $(C_1-C_{12})$alkyl, a bond to a nitrogen atom, chlorine, and bromine. In some embodiments, any of $R^1$, $R^2$, and $R^3$ may be a combination of phenyl, $(C_1-C_{12})$alkyl, a bond to a nitrogen atom, chlorine, and bromine. For instance, any of $R^1$, $R^2$, and $R^3$ may be benzyl or methylphenyl. At least one instance of $R^1$, $R^2$, and $R^3$ must be a bond to a nitrogen atom. In some embodiments, $R^1$, $R^2$, and $R^3$ are each independently selected from methyl, phenyl, chlorine, and a bond to a nitrogen atom.

In some embodiments, Y is ethylene; and each instance of $R^1$, $R^2$, and $R^3$ is methyl or a bond to a nitrogen atom. At least one instance of $R^1$, $R^2$, and $R^3$ is a bond to a nitrogen atom.

In some embodiments, a polydisilazane resin of formula:

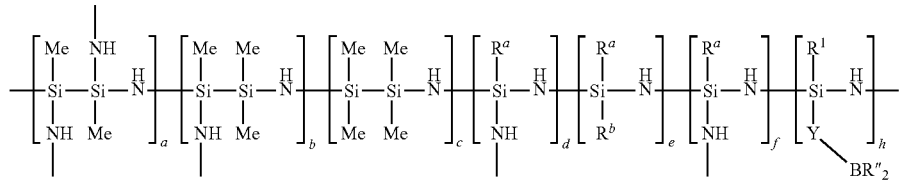

is disclosed. In some embodiments, R" is —Y—$SiR^1R^2R^3$. Y, $R^1$, and $R^3$ are defined supra. The bonds from the NH moieties drawn above represent a bond to another Si atom.

In some embodiments, $R^a$ is selected in each instance from hydrogen, $(C_1-C_{12})$alkyl, phenyl, vinyl, allyl or a combination thereof. A combination could include, as a non-limiting example, styryl group (vinylbenzyl). In some embodiments, $R^a$ is selected in each instance from $(C_1-C_4)$alkyl, phenyl, vinyl, allyl and vinylbenzyl.

In some embodiments, $R^b$ is selected in each instance from chlorine, hydrogen, $(C_1-C_{12})$alkyl, phenyl, vinyl, allyl or a combination thereof. In some embodiments, $R^b$ is selected from chloro, $(C_1-C_4)$alkyl, phenyl, vinyl, allyl and vinylbenzyl.

In polydisilazane resins of the formula above, at least one of $R^a$ and $R^b$ is vinyl or allyl.

In some embodiments, a, b, c, d, e, f, and h each represent a molar fraction of each unit in the polydisilazane resin. The total sum of a+b+c+d+e+f+h is 1.

In some embodiments, the concentration of boron in the polydisilazane resin is between 0.1 wt % and 2 wt % of the polydisilazane resin. In other embodiments, the concentration of boron is between 0.2 wt % and 1 wt % of the polydisilazane resin.

The disclosure further relates to a method of forming a polydisilazane resin. This method includes reacting in an oxygen-free and moisture-free system:

a) at least one methylchlorodisilane;
b) at least one organochlorosilane;
c) an additive of formula I

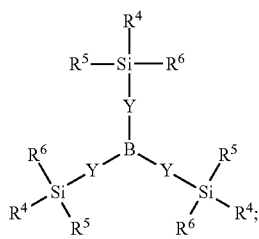

and d) at least one nitrogen-containing additive.

In some embodiments, Y is $(C_2-C_3)$alkylene. In some embodiments, Y is —$CH_2CH_2$—. In some embodiments, Y is —$CH(CH_3)$—. In some embodiments, Y is —$CH_2CH_2CH_2$—. In some embodiments, Y is —$CH_2$—CH($CH_3$)—.

In some embodiments, $R^4$, $R^5$, and $R^6$ are each independently selected from phenyl, $(C_1-C_{12})$alkyl, chlorine, and bromine. In some embodiments, any of $R^4$, $R^5$, and $R^6$ may be a combination of phenyl, $(C_1-C_{12})$alkyl, chlorine, and bromine. For instance, any of $R^4$, $R^5$, and $R^6$ may be benzyl or methylphenyl. At least one instance of $R^4$, $R^5$, and $R^6$ must be selected from chlorine and bromine. In some embodiments, $R^4$, $R^5$, and $R^6$ are each independently selected from methyl, phenyl and chlorine.

In some embodiments, Y is ethylene and each instance of $R^4$, $R^5$, and $R^6$ is methyl, phenyl, or chlorine.

Boron allows for the manufacture of high quality silicon carbide materials by acting as a useful sintering aid during high temperature heat treatment. The boron-containing additive described above can be prepared with high yield by hydroboration of, for instance, at least one of vinyldimethylchlorosilane, vinylmethyldichlorosilane, vinyltrichlorosilane, allydimethylchlorosilane, allylmethyldichlorosilane, or allyltrichlorosilane, or their combination, with borane, $BH_3$. Borane can be delivered to the reaction as an inexpensive, commercially available $BH_3$ complex with dimethylsulfide, tetrahydrofurane or trialkylamines. One representative scheme for synthesizing the boron-containing additive is shown below in Scheme 1:

Scheme 1. Synthesis of the alkyl boranes containing Si—Cl functional groups

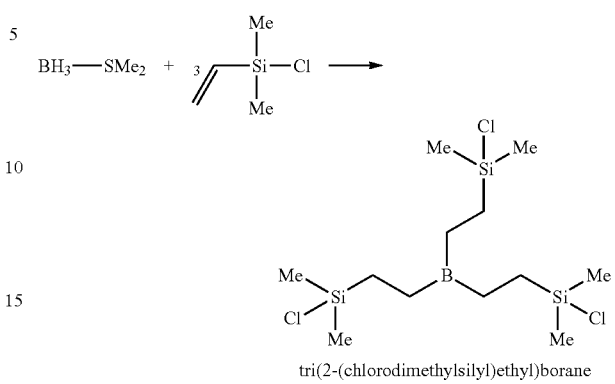

tri(2-(chlorodimethylsilyl)ethyl)borane

In some embodiments, the methylchlorodisilane is 1,2-dichloro-1,1,2,2-tetramethyldisilane. In some embodiments, the methylchlorodisilane is 1,1,2-trichloro-1,2,2-trimethyldisilane. In some embodiments, the methylchlorodisilane is 1,1,2,2-tetrachloro-1,2-dimethyldisilane. In some embodiments, the methylchlorodisilane may be a mixture of one or more methylchlorodisilanes listed above.

In some embodiments, the organochlorosilane contains at least one vinyl or allyl group. In some embodiments, the concentration of olefin in the polydisilazane resin is greater than 1 mol/kg. In some embodiments, the concentration of olefin in the polydisilazane resin is between 1 mol/kg and 8 mol/kg. An olefin, for purposes of this disclosure, includes a moiety containing at least one carbon-to-carbon double-bond. Mixtures of organochlorosilanes may be present in some embodiments. In some embodiments, the organochlorosilane is of formula

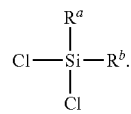

In some embodiments, $R^a$ is selected from hydrogen, $(C_1-C_{12})$alkyl, phenyl, vinyl, allyl or a combination thereof. In some embodiments, $R^a$ is selected from $(C_1-C_4)$alkyl, phenyl, vinyl, allyl and vinylbenzyl.

In some embodiments, $R^b$ is selected from chlorine, hydrogen, $(C_1-C_{12})$alkyl, phenyl, vinyl, allyl or a combination thereof. In some embodiments, $R^b$ is selected from chloro, $(C_1-C_4)$alkyl, phenyl, vinyl, allyl and vinylbenzyl.

In some embodiments, the nitrogen-containing additive is selected from hexamethyldisilazane, tetramethyldisilazane, divinyltetramethyldisilazane, methylamine, and ammonia. In some embodiments, the nitrogen-containing additive is hexamethyldisilazane.

One representative scheme for synthesizing a polydisilazane resin is shown below in Scheme 2:

Scheme 2. Representative synthesis and structure of a polydisilazane resin

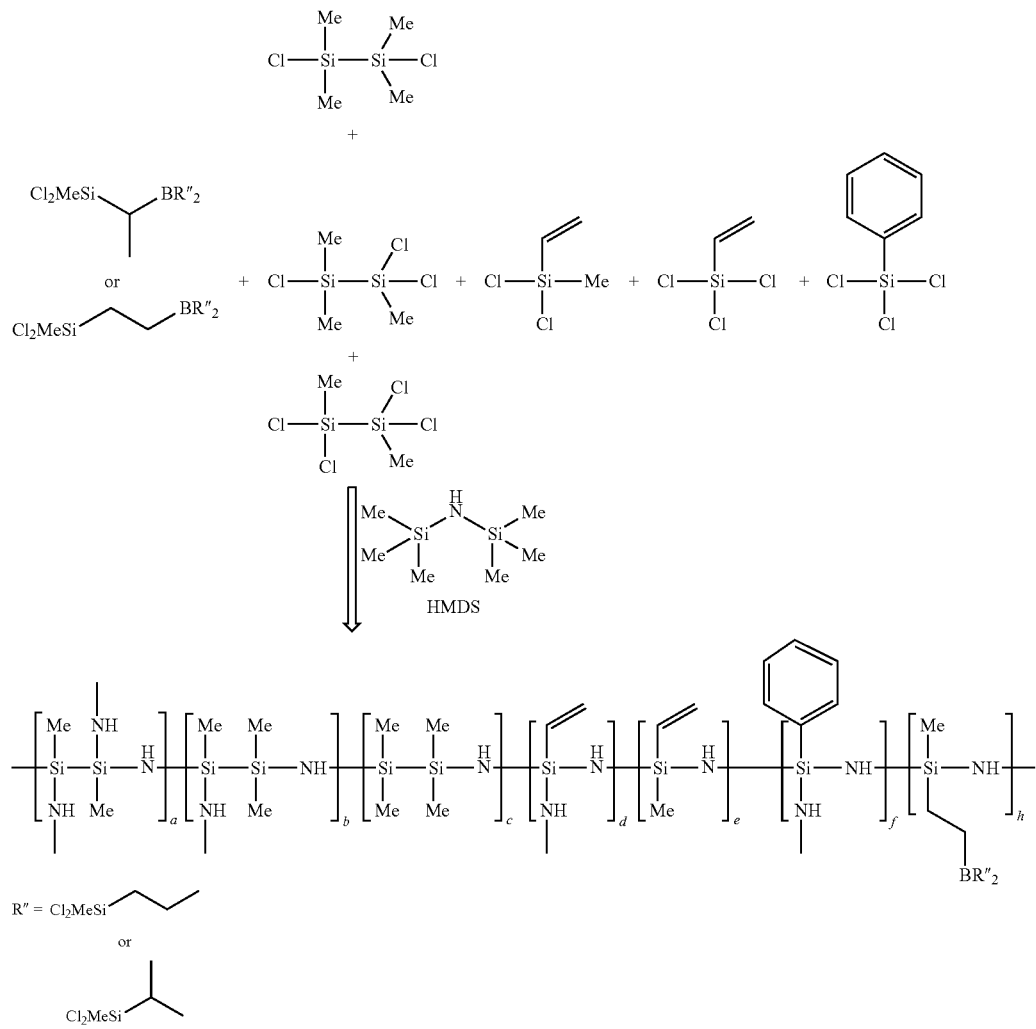

In another aspect, the disclosure relates to a method of preparing a silicon carbide fiber. This method includes forming a polydisilazane resin in an oxygen-free and moisture-free system (as described supra), spinning the polydisilazane resin to form a polydisilazane fiber, exposing the polydisilazane fiber to oxygen and optionally moisture to form a cross-linked polydisilazane fiber; and heating the cross-linked polydisilazane fiber.

After the polydisilazane resin is formed, it is spun to form a polydisilazane fiber. Methods of spinning resin into fibers are well known in the art and are not discussed here. Any known method of spinning fibers is acceptable for purposes of this process, provided that the spinning is performed in a controlled moisture-free and oxygen-free atmosphere.

The polydisilazane fiber is then exposed to oxygen, air, or the mixture of air with inert gas such as nitrogen to form a cross-linked polydisilazane fiber. The fiber may also be exposed optionally to moisture. In some embodiments, this exposure to oxygen-containing gas is performed at a temperature between 20° C. and 200° C. Cross-linking, for purposes of this disclosure, involves cross-linking at least the outer surface of the polydisilazane fiber. Exposure of the polydisilazane fiber (or resin) of the invention to oxygen triggers a radical chain process.

The cross-linked polydisilazane fiber is then heated. In some embodiments, the cross-linked polydisilazane fiber is heated in an inert gaseous atmosphere to a temperature of at least 800° C. and below 1400° C. to form an amorphous SiCNO fiber. The amorphous SiCNO fiber then is converted into a crystalline SiC fiber. In some embodiments, this conversion is accomplished by heating the SiCNO fiber in an inert gaseous atmosphere. In some embodiments, this conversion is accomplished by heating the SiCNO fiber in a temperature range from 1400° C. to 2000° C. The polydisilazane resin disclosed herein contains an adequate amount of boron to serve as a sintering aid during this high temperature heat treatment of the SiCNO fibers, allowing for manufacturing of SiC fibers with high density and fine SiC grain.

In another embodiment, the disclosure relates to a method of preparing a silicon carbide coating. This method includes forming a polydisilazane resin in an oxygen-free and moisture-free system (as described supra), applying the polydisilazane resin to a substrate to form a coating, exposing the polydisilazane coating to oxygen-containing atmosphere (as described supra) and optionally moisture to form a cross-linked polydisilazane coating; and heating the cross-linked polydisilazane coating.

Unless otherwise specified, alkyl (alkylene) is intended to include linear or branched saturated hydrocarbon structures. Hydrocarbon refers to any substituent comprised of hydrogen and carbon as the only elemental constituents. Lower alkyl refers to alkyl groups of from 1 to 6 carbon atoms. Examples of lower alkyl groups include methyl, ethyl, propyl, isopropyl, butyl, s- and t-butyl and the like.

The examples presented herein are intended to be merely illustrative, and should not be construed to be any sort of limitation on the scope of the claimed invention. Unless specified otherwise, all of the components are commercially available from common chemical suppliers.

EXAMPLES

Referential Example

Synthesis of Polydisilazane Resin

A mixture of 345 g methylchlorodisilanes, 30.4 g diphenyldichlorosilane, 48.8 g phenylvinyldichlorosilane, and 100 ml of $BCl_3$ as 1-molar solution in heptane were charged to 1 L, 3-neck round bottomed flask equipped with mechanical stirrer, Dean-Stark trap with condenser, thermocouple, and addition funnel under atmosphere of dry nitrogen. Subsequently, 40 g of hexamethyldisilazane (HMDS) was added quickly via addition funnel to complex free $BCl_3$. The obtained reaction mixture was slowly heated to 100° C. and 604 g of HMDS was added drop wise when the reaction temperature was 100° C. Heptane and trimethylchlorosilane, the volatile by-product of the reaction of HMDS with chlorosilanes, were removed progressively by a simple distillation as HMDS was added. The temperature of reaction was raised to 135° C. when addition of HMDS was completed. Subsequently, the reaction mixture was cooled down to 80° C., and about 200 ml of toluene was added to the reactor. The white suspension was filtered under nitrogen through a 0.7 micron glass matt. The clarified reaction mixture was transferred back to the reactor and then slowly heated to 150° C. and subsequently to 180° C. The reaction mixture was cooled after holding for 2 hrs at 180° C. 236 g of solid polymer was removed from the flask and grinded into powder in a dry box. The final polymer had a melt viscosity of 200000 cPs at 140° C.

The above polydisilazane resin was melt-spun at 150° C. to form a tow of 40 fibers with a diameter about 22 um. The obtained fibers were heat treated in the 1:5 mixture of dry air with dry nitrogen as presented in Table 1. The conversion of vinyl groups in the polydisilazane resin was determined by $H^1$ NMR of the fibers digested in $CD_3OD/KOD$. Subsequently, the heat treated fibers were pyrolyzed in pure nitrogen at 1100° C. to yield black ceramic fibers as presented in Table 2.

Example 1

Synthesis of Polydisilazane Resin with Boron Additive 1

100 ml of $THF-BH_3$ as 1-molar solution in THF were charged to 1 L, 3-neck round bottomed flask equipped with mechanical stirrer, Dean-Stark trap with condenser, thermocouple, and addition funnel under atmosphere of dry nitrogen. Subsequently, the reaction mixture was cooled to 0° C. and 53.6 g of vinylmethyldichlorosilane were added drop-wise via addition funnel with a rate of 1 ml/min. The obtained reaction mixture was allowed to warm up to RT and was mixed with a mixture of 216 g methylchlorodisilane, 31.6 g phenyltrichlorosilane, and 61.3 g phenylvinyldichlorosilane. The reaction mixture was slowly heated to 100° C. and 467 g of HMDS was added drop-wise when the reaction temperature reached 100° C. THF and trimethylchlorosilane, the volatile by-product of the reaction of HMDS with chlorosilanes, were removed progressively by a simple distillation as HMDS was added. The temperature of reaction was raised to 135° C. when addition of HMDS was completed. Subsequently, the reaction mixture was cooled down to 80° C., and about 200 ml of toluene was added to the reactor. The white suspension was filtered under nitrogen through a 0.7 micron glass matt. The clarified reaction mixture was transferred back to the reactor and then slowly heated to 150° C. and subsequently to 180° C. The reaction mixture was cooled after holding for 2 hrs at 180° C. 213 g of solid polymer was removed from the flask and grinded into powder in a dry box. The final polymer had a melt viscosity of 80000 cPs at 130° C. and a concentration of vinyl group of 1.3 mol/Kg. The above polydisilazane resin with additive 1 was melt-spun at 130° C. to form a tow of 40 fibers with diameter about 22 um. The obtained polydisilazane fibers were heat treated in the 1:5 mixture of dry air with dry nitrogen as presented in Table 1. The conversion of vinyl groups in the polydisilazane resin was determined by $H^1$ NMR of the fibers digested in $CD_3OD/KOD$. Subsequently, the heat treated, cross-linked fibers were pyrolyzed in pure nitrogen at 1100° C. to yield black ceramic fibers (amorphous SiCNO fibers) as presented in Table 2.

Example 2

Synthesis of Polydisilazane Resin with Boron Additive 2

200 ml of $THF-BH_3$ as 1-molar solution in THF were charged to 1 L, 3-neck round bottomed flask equipped with mechanical stirrer, Dean-Stark trap with condenser, thermocouple, and addition funnel under atmosphere of dry nitrogen. Subsequently, the reaction mixture was cooled to 0° C. and a mixture of 42.8 g of vinylmethyldichlorosilane and 36.7 g of vinyldimethylchlorosilane was added drop-wise via addition funnel with a rate of 1 ml/min. The obtained reaction mixture was allowed to warm up to RT and was mixed with a mixture of 345 g methylchlorodisilane, 50.7 g phenyltrichlorosilane, and 98.2 g phenylvinyldichlorosilane. The reaction mixture was slowly heated to 100° C. and 721 g of HMDS was added drop-wise when a reaction temperature reached 100° C. THF and trimethylchlorosilane, the volatile by-product of the reaction of HMDS with chlorosilanes, were removed progressively by a simple distillation as HMDS was added. The temperature of reaction was raised to 135° C. when addition of HMDS was completed. Subsequently, the reaction mixture was cooled down to 80° C., and about 200 ml of toluene was added to the reactor. The white suspension was filtered under nitrogen through a 0.7 micron glass matt. The clarified reaction mixture was transferred back to the reactor and then slowly heated to 150° C. and subsequently to 180° C. The reaction mixture was cooled after holding for 2 hrs at 180° C. 336 g of solid polymer was removed from the flask and grinded into powder in a dry box. The final polymer had a melt viscosity of 62000 cPs at 110° C. and a concentration of vinyl group of 1.5 mol/Kg. The above polydisilazane resin with additive 2 was melt-spun at 100° C. to form a tow of 40 fibers with diameter about 22 um. The obtained fibers were heat treated in the 1:5 mixture of dry air with dry nitrogen as presented in Table 1. The conversion of vinyl group in polydisilazane resin was determined by $H^1$ NMR of the fibers digested in $CD_3OD/KOD$. Subsequently, the heat treated, cross-linked fibers were pyrolyzed in pure nitrogen at 1100° C. to yield black ceramic fibers (that is, amorphous SiCNO fibers) as presented in Table 2. To be perfectly clear, the oxygen-free, moisture-free environment is utilized only for the steps of resin synthesis and fiber spinning. The fiber cure (crosslinking) process utilizes an exposure to oxygen and optionally moisture. In the examples shown herein, the exposure to moisture (that is, those examples that were exposed to 50% relative humidity) yielded loose strong fibers. These examples possessed relatively low vinyl content polydisilazane resin; at a higher vinyl content, the exposure to moisture may not be as beneficial.

TABLE 1

Heat treatment of pre-ceramic fibers

| Sample | Resin | 2 hrs at 50% Relative Humidity/ 25° C. | 24 hrs in air/$N_2$ 1:5 at 60° C. | 24 hrs in air/$N_2$ 1:5 at 200° C. | % Vinyl Conversion | Comments |
|---|---|---|---|---|---|---|
| 1A | Referential Example | yes | yes | no | 0 | loose white fibers |
| 1B | Referential Example | yes | yes | yes | 0 | semi melted yellow fiber |
| 2A | Example 1 | No | yes | no | 30 | loose light yellow fibers |
| 2B | Example 1 | No | yes | yes | 70 | loose dark yellow fibers |
| 2C | Example 1 | yes | yes | yes | ND | loose dark yellow fibers |
| 3A | Example 2 | No | yes | no | 34 | loose light yellow fibers |
| 3B | Example 2 | No | yes | yes | 78 | loose dark yellow fibers |
| 3C | Example 2 | yes | yes | yes | ND | loose dark yellow fibers |

TABLE 2

Pyrolysis of the heat treated pre-ceramic fibers to 1100° C. in pure nitrogen

| Sample | Comment |
|---|---|
| 1B | melted black fibers |
| 2A | semi fused black fibers |
| 2B | loose brittle black fibers |
| 2C | loose strong black fibers |
| 3A | semi fused black fibers |
| 3B | loose brittle black fibers |
| 3C | loose strong black fibers |

The data suggest that those heat treated cross-linked polydisilazane fibers with higher vinyl conversion percentages resulted in black ceramic fibers (amorphous SiNCO fibers) that do not melt or fuse and are stronger than their counterparts with lower vinyl conversion rates.

While several aspects of the present disclosure have been described and depicted herein, alternative aspects may be effected by those skilled in the art to accomplish the same objectives. Accordingly, it is intended by the appended claims to cover all such alternative aspects as fall within the true spirit and scope of the disclosure.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

What is claimed is:

1. A method of forming a polydisilazane resin comprising reacting in an oxygen-free and moisture-free system:
   a) at least one methylchlorodisilane;
   b) at least one organochlorosilane comprising at least one vinyl or allyl group, wherein the concentration of olefin in the polydisilazane resin is greater than 1 mol/kg;
   c) an additive of formula I

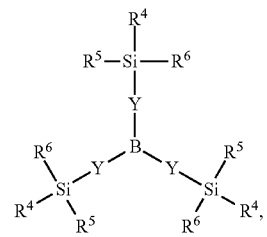

wherein
   Y is $(C_2-C_3)$alkylene; and
   $R^4$, $R^5$, and $R^6$ are each independently selected from phenyl, $(C_1-C_{12})$alkyl, chlorine, and bromine;
   wherein at least one instance of $R^4$, $R^5$, and $R^6$ must be selected from chlorine and bromine; and
   d) at least one nitrogen-containing additive selected from hexamethyldisilazane, tetramethyldisilazane, divinyltetramethyldisilazane, methylamine, and ammonia.

2. A method of forming a polydisilazane resin according to claim 1, wherein said nitrogen-containing additive is hexamethyldisilazane.

3. A method of forming a polydisilazane resin according to claim 1, wherein $R^4$, $R^5$, and $R^6$ are each independently selected from methyl, phenyl and chlorine.

4. A method of forming a polydisilazane resin according to claim 1, wherein
Y is selected from —CH$_2$CH$_2$—, —CH(CH$_3$)—, —CH$_2$CH$_2$CH$_2$—, and —CH$_2$—CH(CH$_3$)—; and
each instance of $R^4$, $R^5$, and $R^6$ is methyl, phenyl, or chlorine.

5. A method of forming a polydisilazane resin according to claim 1, wherein said organochlorosilane is of formula

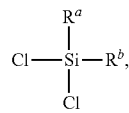

wherein
$R^a$ is selected from hydrogen, (C$_1$-C$_{12}$)alkyl, phenyl, vinyl, allyl or a combination thereof; and
$R^b$ is selected from chlorine, hydrogen, (C$_1$-C$_{12}$)alkyl, phenyl, vinyl, allyl or a combination thereof.

6. A method of forming a polydisilazane resin according to claim 5, wherein $R^a$ is selected from (C$_1$-C$_4$)alkyl, phenyl, vinyl, allyl and vinylbenzyl.

7. A method of forming a polydisilazane resin according to claim 5, wherein $R^b$ is selected from chloro, (C$_1$-C$_4$)alkyl, phenyl, vinyl, allyl and vinylbenzyl.

8. A method of preparing a silicon carbide fiber, comprising:
a) forming a polydisilazane resin in an oxygen-free and moisture-free system, said forming comprising reacting:
i) at least one methylchlorodisilane;
ii) at least one organochlorosilane comprising at least one vinyl or allyl group wherein the concentration of olefin in the polydisilazane resin is above 1 mol/kg;
iii) at least one nitrogen-containing additive selected from hexamethyldisilazane, tetramethyldisilazane, divinyltetramethyldisilazane, methylamine and ammonia; and
iv) an additive of formula I

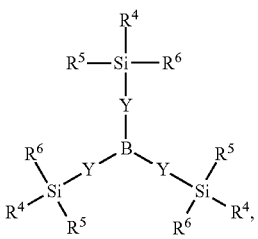

wherein
Y is (C$_2$-C$_3$)alkylene; and
$R^4$, $R^5$, and $R^6$ are each independently selected from phenyl, (C$_1$-C$_{12}$)alkyl, phenyl, chlorine, and bromine;
wherein at least one instance of $R^4$, $R^5$, and $R^6$ must be selected from chlorine and bromine;
b) spinning said polydisilazane resin to form a polydisilazane fiber;
c) exposing said polydisilazane fiber to oxygen, air, or the mixture of air with inert gas such as nitrogen, and optionally moisture, to form a cross-linked polydisilazane fiber; and
d) heating said cross-linked polydisilazane fiber.

9. A method of preparing a silicon carbide fiber according to claim 8, wherein said exposing a polydisilazane fiber step is performed at a temperature between 20° C. and 200° C.

10. A method of preparing a silicon carbide fiber according to claim 8, wherein said heating of the cross-linked polydisilazane fiber is performed in an inert gaseous atmosphere to a temperature of at least 800° C. to form an amorphous SiCNO fiber.

11. A method of preparing a silicon carbide fiber according to claim 10, wherein said amorphous SiCNO fiber contains boron at a concentration between 0.02 wt % and 2 wt %.

12. A method of preparing a silicon carbide fiber according to claim 10, further comprising converting said amorphous SiCNO fiber into a crystalline SiC fiber by heating in an inert gaseous atmosphere in a temperature range from 1400° C. to 2000° C.

* * * * *